US010084295B2

(12) United States Patent
Imoto et al.

(10) Patent No.: US 10,084,295 B2
(45) Date of Patent: Sep. 25, 2018

(54) ELECTRIC NOISE REDUCTION DEVICE WITH RETAINER

(71) Applicant: Konica Minolta, Inc., Tokyo (JP)

(72) Inventors: Tomiko Imoto, Toyohashi (JP); Syuichi Katogi, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/072,914

(22) Filed: Mar. 17, 2016

(65) Prior Publication Data
US 2016/0305604 A1    Oct. 20, 2016

(30) Foreign Application Priority Data

Apr. 17, 2015 (JP) ................. 2015-084704

(51) Int. Cl.
F16M 13/02 (2006.01)
H02G 7/05 (2006.01)
H02G 7/14 (2006.01)
H02G 7/00 (2006.01)
H02G 3/02 (2006.01)
H01F 17/06 (2006.01)
H01F 27/02 (2006.01)
H01F 27/33 (2006.01)

(52) U.S. Cl.
CPC ............... *H02G 3/02* (2013.01); *H01F 17/06* (2013.01); *H01F 27/027* (2013.01); *H01F 27/33* (2013.01); *H01F 2017/065* (2013.01); *H02G 7/05* (2013.01); *H02G 7/14* (2013.01)

(58) Field of Classification Search
CPC . F16L 3/223; F16L 3/1075; F16L 5/00; F16L 13/02; H02G 3/0456; H02G 7/05; H02G 7/14; H02B 6/4471; H01F 17/06; H01F 27/027; H01F 2017/065; H01F 27/33
USPC ..... 248/58, 59, 60, 61, 63, 65, 68.1; 174/50, 174/68.1
See application file for complete search history.

(56) References Cited

U.S. PATENT DOCUMENTS 6,318,680 B1 * 11/2001 Benedict .................. F16L 5/00
174/68.1
7,012,496 B2 * 3/2006 Sugiura ................ H01F 17/062
336/174
7,021,591 B1 * 4/2006 Gretz ...................... F16L 3/223
248/68.1
7,520,476 B2 * 4/2009 Caveney .............. H02G 3/0456
248/59

(Continued)

FOREIGN PATENT DOCUMENTS

JP    H11204980 A    7/1999
JP    2005-197552 A    7/2005

(Continued)

OTHER PUBLICATIONS

Notification of Reasons for Refusal dated Jul. 4, 2017 from corresponding Japanese Patent Application No. JP 2015-084704 and English translation; Total of 6 pages.

*Primary Examiner* — Tan Le
(74) *Attorney, Agent, or Firm* — Lucas & Mercanti, LLP

(57) ABSTRACT

In a retainer member for retaining a noise reduction member, a retaining portion for retention of a noise reduction member wound with a cable is provided with a claw for locking the cable wound on the noise reduction member.

9 Claims, 5 Drawing Sheets

(56) References Cited

U.S. PATENT DOCUMENTS

| | | | |
|---|---|---|---|
| 7,837,156 B1 * | 11/2010 | Handler | F16L 3/1058 |
| | | | 248/339 |
| 8,667,756 B1 * | 3/2014 | Sareyka | E04B 9/18 |
| | | | 52/506.06 |
| 8,840,071 B2 * | 9/2014 | Oh | F16L 3/1075 |
| | | | 248/58 |
| 8,879,881 B2 * | 11/2014 | Cote | G02B 6/4471 |
| | | | 174/50 |
| 2011/0012485 A1 * | 1/2011 | Busing | A47L 15/4217 |
| | | | 312/228 |

FOREIGN PATENT DOCUMENTS

| | | |
|---|---|---|
| JP | 2007324158 A | 12/2007 |
| JP | 2012-094758 A | 5/2012 |

* cited by examiner

ELECTRIC NOISE REDUCTION DEVICE WITH RETAINER

RELATED APPLICATION

The priority application Number Japanese Patent Application 2015-084704 filed on Apr. 17, 2015 upon which this application is based is hereby incorporated by reference.

BACKGROUND OF THE INVENTION

Field of the Invention

The present invention relates to a retainer member for noise reduction member which retains a noise reduction member with a cable wound thereon. More particularly, the invention is characteristic in configuring the retainer member to mount in position the noise reduction member wound with the cable by retaining the noise reduction member in a proper manner preventing the rattle of the noise reduction member wound with the cable, thus providing stable noise reduction.

Description of the Related Art

In order to suppress the influence of noises occurring inside or outside an electronic device or image forming apparatus via the cable, it has been a conventional practice to wind the cable on the noise reduction member such as a ferrite core and to fix the noise reduction member in the vicinity of a noise source so as to permit the noise reduction member to reduce the noises propagating through the cable.

A method of fixing the noise reduction member wound with the cable to place near the noise source is disclosed in a patent document 1 (Japanese Unexamined Patent Publication No. H11(1999)-204980)). According to the method, a cover of the noise reduction member wound with the cable is formed with an arrowhead fixing portion. The noise reduction member is fixed to a mount subject such as an apparatus by inserting the arrowhead fixing portion in a hole formed at the mount subject.

Further, a patent document 2 (Japanese Unexamined Patent Publication No. 2007-324158) discloses a structure where the noise reduction member is clamped between an outside-periphery retaining portion elastically urged against an outside periphery of the noise reduction member and an inside-periphery retaining portion elastically urged against an inside periphery of the noise reduction member so that the noise reduction member is locked in position by engagement with projections formed at respective distal ends of the retaining portions.

The method suggested by the patent document 1 suffer from the disadvantage of poor generality and high cost of the noise reduction member because the arrowhead fixing portion is formed at the cover of the noise reduction member and the noise reduction member is fixed in position by inserting the arrowhead fixing portion in the hole formed at the mount subject. The method also has a problem such that an operation of removing the noise reduction member is difficult in the event of a failure of the cable wound on the noise reduction member or in a case where a position to mount the noise reduction member is changed to a suitable position.

In the structure of the patent document 2 where the noise reduction member is clamped between the outside-periphery retaining portion and the inside-periphery retaining portion, the number of winding the cable on the noise reduction member is limited because of the existence of the inside-periphery retaining portion on the inside periphery of the noise reduction member. Therefore, the noise reduction member must be detrimentally increased in size in order to permit a long cable to be wound thereon.

SUMMARY OF THE INVENTION

According to an aspect of the invention, a retainer member for noise reduction member includes a retaining portion for retention of a noise reduction member wound with a cable, and has a structure where the retaining portion includes a claw for locking the cable wound on the noise reduction member.

According to another aspect of the invention, the retainer member preferably has a structure where the cable is locked in position by inserting the claw between the noise reduction member and the cable wound on the noise reduction member.

According to another aspect of the invention, the retainer member preferably has a structure where the retaining portion includes a suspension portion for suspension of one end of the cable wound on the noise reduction member and extended from the noise reduction member.

According to another aspect of the invention, the retainer member preferably has a structure where the retaining portion includes a placement portion for placement of the noise reduction member wound with the cable.

According to another aspect of the invention, the retainer member preferably has a structure where more than one of the retaining portions is provided.

According to another aspect of the invention, the retainer member preferably includes a cover part for covering a proper area.

According to another aspect of the invention, the retainer member preferably includes a fixing portion for fixing the retainer member to a mount subject.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

A retainer member for noise reduction member according to the invention is configured to retain a noise reduction member wound with a cable by means of retaining portions each using a claw thereof to lock the cable wound on the noise reduction member.

Such a configuration ensures that the retainer member retains the noise reduction member wound with the cable in a proper manner preventing the rattle of the noise reduction member. Further, the retainer member is adapted for easy mounting of the noise reduction member wound with the cable to the proper position.

Next, a retainer member for noise reduction member according to an embodiment of the invention is specifically described with reference to the accompanying drawings. It is to be noted that the retainer member for noise reduction member according to the invention is not limited to the following embodiment but may be otherwise variously embodied without departing from the scope of the invention.

Figure 1:
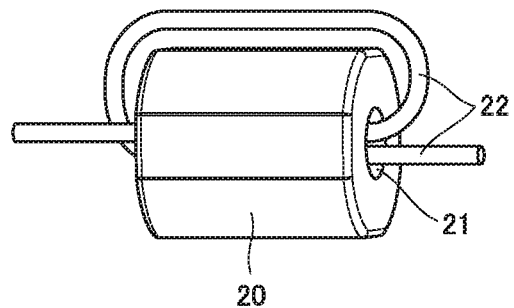
FIG. 1 is a schematic diagram illustrating a noise reduction member according to an embodiment of the invention, which has a cable inserted through a central hole thereof and wound thereon.

As shown in FIG. 1, a cylindrical noise reduction member 20 accommodating a ferrite core therein is used in the embodiment of the invention. A cable 22 is inserted through a central hole 21 of the noise reduction member 20 and wound on the noise reduction member 20.

Figure 2:
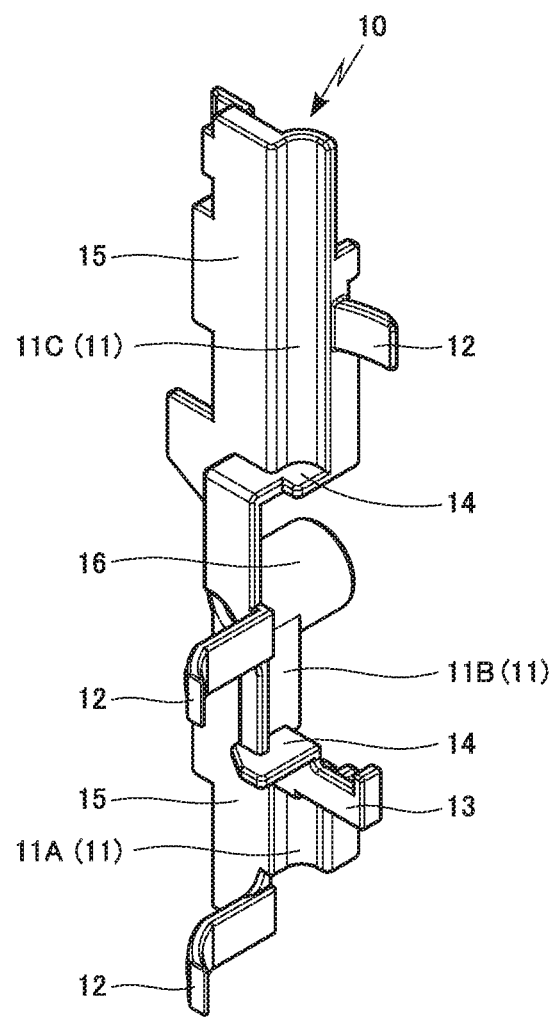
FIG. 2 is a schematic perspective view showing a retainer member according to the above embodiment, which includes first to third retaining portions for retention of the noise reduction members wound with the cable.

As shown in FIG. 2, the retainer member 10 according to the embodiment includes three retaining portions 11A, 11B, 11C which are arranged in series and serve as a retaining portion 11 for retaining the noise reduction member 20 wound with the cable 22 as described above.

Figure 3:
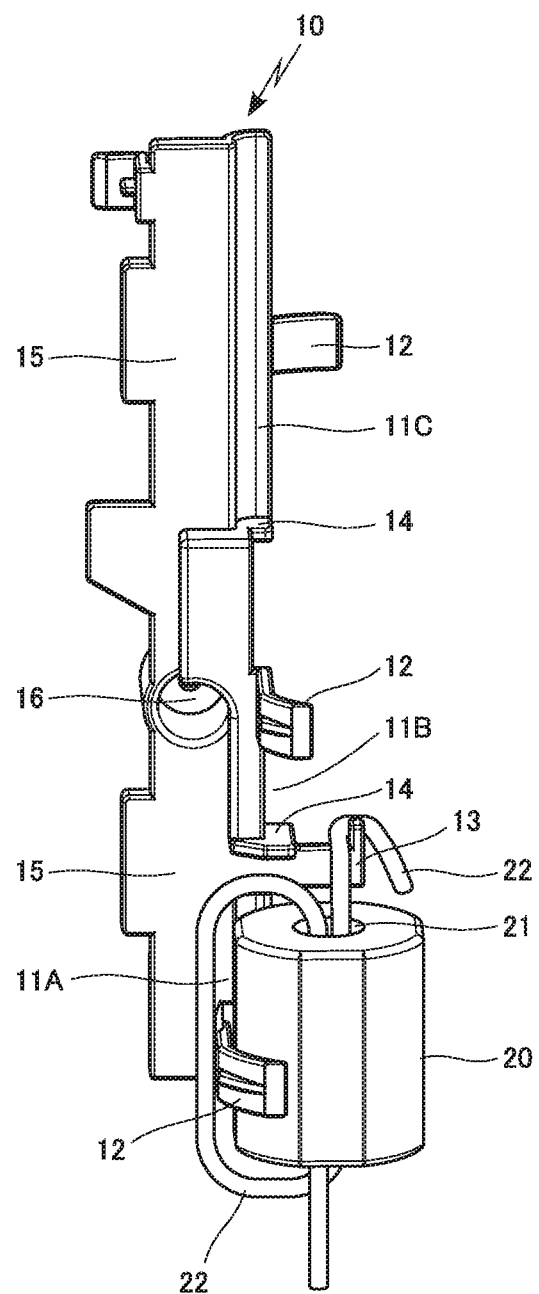
FIG. 3 is a schematic perspective view showing a state where the noise reduction member wound with the cable is retained by the first retaining portion of the retainer member according to the above embodiment.

As shown in FIG. 2 and FIG. 3, the first retaining portion 11A includes a claw 12 for locking the cable 22, and a suspension portion 13 for suspension of one end of the cable 22 wound on the noise reduction member 20 and extended from the noise reduction member 20. The claw 12 is inserted between the noise reduction member 20 and the cable 22 wound on the noise reduction member 20 so as to lock the cable 22. Further, the first retaining portion 11A retains the noise reduction member 20 wound with the cable 22 while permitting the suspension portion 13 thereof to suspend the one end of the cable 22 wound on the noise reduction member and extended from the noise reduction member 20.

Figure 4:
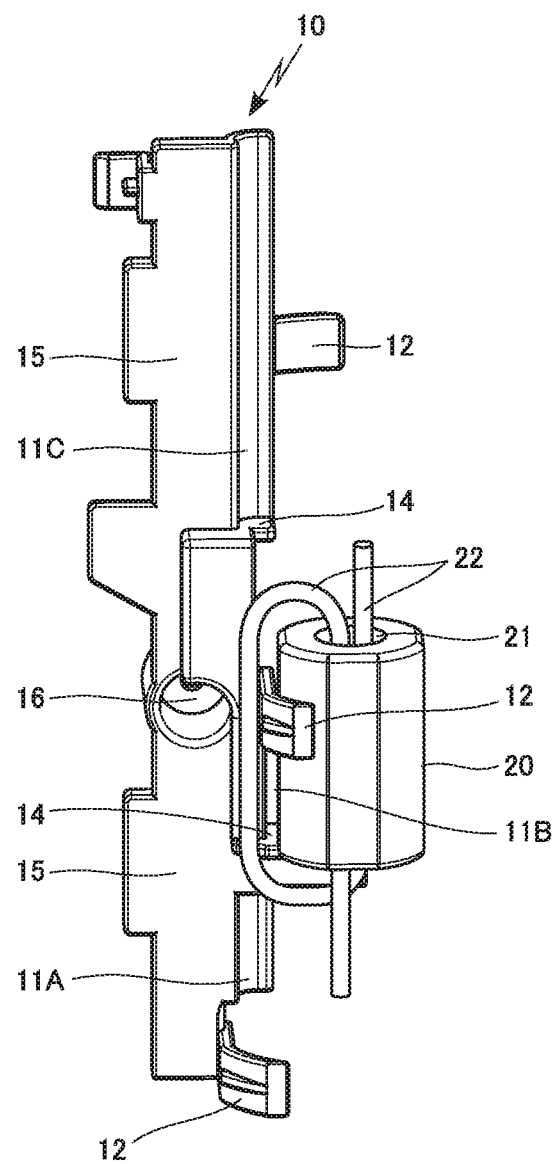
FIG. 4 is a schematic perspective view showing a state where the noise reduction member wound with the cable is retained by the second retaining portion of the retainer member according to the above embodiment.

As shown in FIG. 2 and FIG. 4, the second retaining portion 11B includes a claw 12 for locking the cable 22, and a placement portion 14 for placement of the noise reduction member 20 wound with the cable 22. The claw 12 is inserted between the noise reduction member 20 and the cable 22 wound on the noise reduction member 20 so as to lock the cable 22. Further, the second retaining portion 11B retains the noise reduction member 20 wound with the cable 22 while permitting the noise reduction member 20 wound with the cable 22 to rest on the placement portion 14 thereof.

Figure 5:
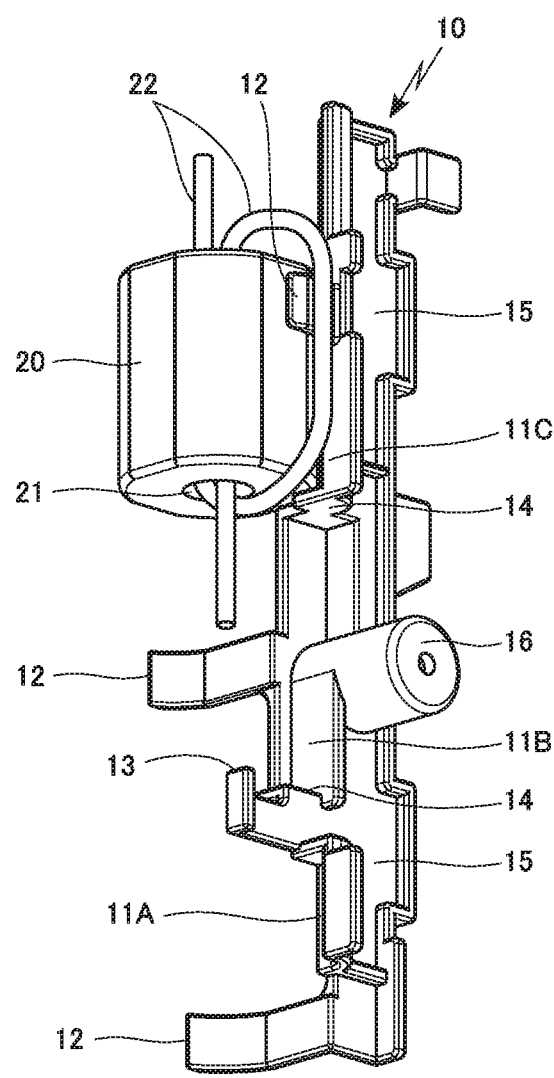
FIG. 5 is a schematic perspective view showing a state where the noise reduction member wound with the cable is retained by the third retaining portion of the retainer member according to the above embodiment.

As shown in FIG. 2 and FIG. 5, the third retaining portion 11C includes a claw 12 for locking the cable 22, and a placement portion 14 for placement of the noise reduction member 20 wound with the cable 22. The claw 12 is inserted between the noise reduction member 20 and the cable 22 wound on the noise reduction member 20 so as to lock the cable 22. Further, the third retaining portion 11C retains the noise reduction member 20 wound with the cable 22 while permitting the noise reduction member 20 wound with the cable 22 to rest on the placement portion 14 thereof.

Figure 6:
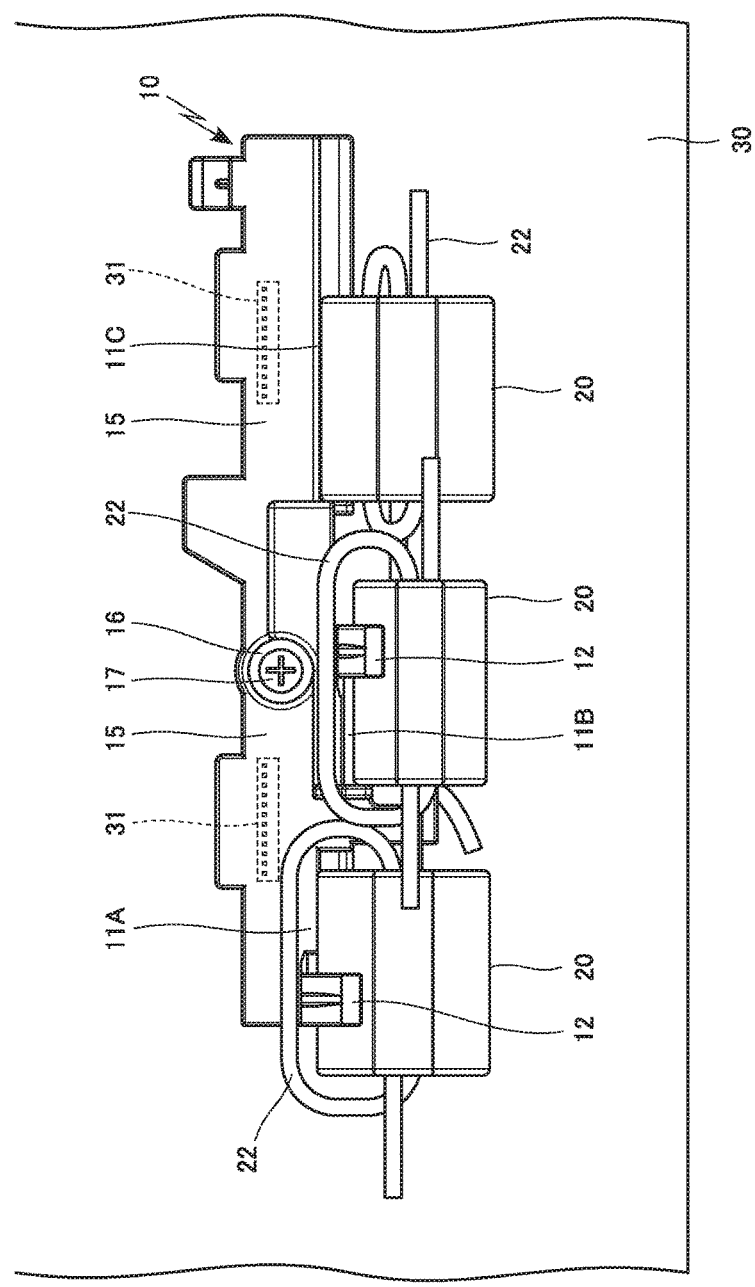
FIG. 6 is a schematic diagram illustrating a state where the retainer member with the first to third retaining portions retaining the noise reduction members wound with the cable is mounted to a mount subject in a manner to cover a harness part by means of a cover part thereof.

As shown in FIG. 2 to FIG. 5, the retainer member 10 according to this embodiment is provided with a cover part 15 at an area where the retaining portions 11A, 11B, 11C, each retaining the noise reduction member 20 wound with the cable 22, are connected in series. As shown in FIG. 6, this cover part 15 covers a harness part 31 disposed at a mount subject 30 such as an apparatus to which the retainer member 10 is mounted. The retainer member 10 further includes a fixing portion 16 for fixing this retainer member 10 to the mount subject 30. As shown in FIG. 6, the retainer member 10 is fixed to the mount subject 30 with a screw 17 through this fixing portion 16.

This configuration ensures that the respective retaining portions 11A, 11B, 11C of the retainer member 10 retain the noise reduction members 20 wound with the cable 22 in a proper manner preventing the rattle of the noise reduction members. With the cover part 15 properly covering and protecting the harness part 31 and the like, the retainer member 10 permits the noise reduction members 20 wound with the cable 22 to be easily mounted to the mount subject 30 such as the apparatus at a proper position.

According to this embodiment, the retainer member 10 includes three retaining portions 11 connected in series and each retaining the noise reduction member 20 wound with the cable 22. It is noted however that the number of retaining portions 11 provided at the retainer member 10 is not limited. Further, the plural retaining portions 11 may also be arranged in parallel.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

The invention claimed is:

1. An electrical noise reduction apparatus comprising:
an electrical noise reduction member and a conductor cable wound on the noise reduction member, the electrical noise reduction member suppressing electrical noise propagating through the conductor cable, and
a retaining member including a retaining portion for retention of the electrical noise reduction member,
wherein the retaining portion includes a claw and the claw is inserted between the electrical noise reduction member and the conductor cable wound on the electrical noise reduction member so that the electrical noise reduction member is retained by the retaining member, and
wherein the conductor cable is locked in position by the claw inserted between the electrical noise reduction member and the conductor cable wound on the electrical noise reduction member.

2. The electrical noise reduction apparatus according to claim 1, wherein
the retaining portion includes a suspension portion for suspending one end of the conductor cable wound on the electrical noise reduction member and extended from the electrical noise reduction member.

3. The electrical noise reduction apparatus according to claim 1, wherein
the retaining portion includes a placement portion for placement of the electrical noise reduction member relative to the retaining portion.

4. The electrical noise reduction apparatus according to claim 1, wherein
more than one of the retaining portions is provided.

5. The electrical noise reduction apparatus according to claim 1, further comprising a cover part for covering a proper area.

6. The electrical noise reduction apparatus according to claim 1, further comprising a fixing portion for fixing the retainer member to a mount subject.

7. A retaining device in combination with an electrical noise reduction member wound with a conductor cable, the electrical noise reduction member suppressing electrical noise propagating through the conductor cable, the retaining device comprising:

a retaining member including a retaining portion for retaining the electrical noise reduction member, the retaining portion including a claw, wherein the electrical noise reduction member is fixed on the retaining device by the claw, which is sandwiched between the conductor cable and the electrical noise reduction member so that the claw is inserted between the electrical noise reduction member and the conductor cable wound on the electrical noise reduction member, wherein the conductor cable is locked in position by the claw inserted between the electrical noise reduction member and the conductor cable wound on the electrical noise reduction member.

8. A method of retaining an electrical noise reduction member by a retaining device comprising the steps of:

providing an electrical noise reduction apparatus including the electrical noise reduction member and the retaining member including a retaining portion for retention of the electrical noise reduction member, winding a conductor cable on the electrical noise reduction member, the electrical noise reduction member suppressing electrical noise propagating through the conductor cable; and sandwiching a claw of the retaining device between the conductor cable and the electrical noise reduction member so that the claw is inserted between the electrical noise reduction member and the conductor cable wound on the electrical noise reduction member, and the claw retains the electrical noise reduction member on the retaining device, wherein the conductor cable is locked in position by the claw inserted between the electrical noise reduction member and the conductor cable wound on the electrical noise reduction member.

9. The electrical noise reduction apparatus according to claim 1, wherein the retaining member is a first retaining member, the claw is a first claw, and the electrical noise reduction member is a first electrical noise reduction member, the first retaining member further includes a suspension portion on which one end of the conductor cable wound on the first electrical noise reduction member is suspended, and the apparatus further comprises a second electrical noise reduction member with a conductor cable wound thereon, a second retaining member with a second claw, the second retaining member further including a placement portion, wherein the second claw is inserted between the conductor cable and the second electrical noise reduction members rests on the placement portion.

* * * * *